United States Patent
Arends et al.

(10) Patent No.: US 6,868,652 B2
(45) Date of Patent: Mar. 22, 2005

(54) SYSTEM AND METHOD FOR PACKAGING ORIENTED CONTAINERS

(75) Inventors: Craig W. Arends, Elgin, IL (US); Lonnie R. Seymour, Naperville, IL (US); Kevin Moore, Hoopeston, IL (US); Christopher T. Schwanz, Muskego, WI (US); Stanley R. Krogman, Bartlett, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/614,478

(22) Filed: Jul. 7, 2003

(65) Prior Publication Data

US 2004/0003575 A1 Jan. 8, 2004

Related U.S. Application Data

(60) Continuation-in-part of application No. 10/280,205, filed on Oct. 25, 2002, now Pat. No. 6,688,465, which is a division of application No. 09/490,212, filed on Jan. 24, 2000, now Pat. No. 6,484,478.

(51) Int. Cl.$^7$ .......................... B65B 35/56; B65G 47/24
(52) U.S. Cl. ...................... 53/446; 53/398; 53/493; 53/544; 198/376; 198/382; 198/395
(58) Field of Search .................... 53/398, 446, 493, 53/48.2, 48.3, 48.4, 48.9, 147, 533, 537, 544; 198/374, 375, 376, 377.01, 377.02, 37, 377.03, 382, 384, 377.07, 394, 395, 398, 399, 400

(56) References Cited

U.S. PATENT DOCUMENTS

| | | | | |
|---|---|---|---|---|
| 2,528,912 A | * | 11/1950 | Rappaport et al. | 198/394 |
| 3,415,350 A | * | 12/1968 | Murphy | 198/394 |
| 3,451,523 A | * | 6/1969 | Evans, Jr. et al. | 198/394 |
| 3,541,751 A | * | 11/1970 | Quebe et al. | 53/398 |
| 3,572,913 A | * | 3/1971 | Korb et al. | 351/245 |
| 3,618,743 A | * | 11/1971 | Benatar et al. | 198/384 |
| 3,635,322 A |   | 1/1972  | Raudat et al. |  |
| 3,811,243 A |   | 5/1974  | Cunningham |  |
| 3,816,968 A | * | 6/1974  | Morgan et al. | 53/48.4 |
| 3,848,394 A |   | 11/1974 | Heisler |  |
| 3,934,714 A |   | 1/1976  | Matsumoto |  |
| 4,051,366 A |   | 9/1977  | Gordon |  |
| 4,344,522 A |   | 8/1982  | Heisler |  |
| 4,383,601 A |   | 5/1983  | Heisler |  |
| 4,428,474 A | * | 1/1984  | Gau et al. | 198/394 |
| 4,561,534 A | * | 12/1985 | Nalbach | 198/400 |
| 4,596,330 A |   | 6/1986  | Benno |  |
| 4,640,406 A |   | 2/1987  | Willison |  |
| 5,048,717 A | * | 9/1991  | Falk et al. | 221/2 |
| 5,058,724 A |   | 10/1991 | Hinton |  |
| 5,074,399 A | * | 12/1991 | Kettle et al. | 198/395 |

(List continued on next page.)

FOREIGN PATENT DOCUMENTS

| | | |
|---|---|---|
| FR | 1.545.680 | 11/1968 |
| FR | 2 652 059 | 3/1991 |
| GB | 2 077 684 A | 12/1981 |
| WO | WO 03/024808 A2 | 3/2003 |

*Primary Examiner*—Rinaldi I. Rada
*Assistant Examiner*—Louis Huynh
(74) *Attorney, Agent, or Firm*—Pauley Petersen & Erickson

(57) ABSTRACT

A system and method for packaging oriented containers in a container carrier wherein a plurality of containers are fed into an orienter device for orienting a container in a desired rotational position prior to placement in a container carrier. The orienter device includes a reader for determining an initial orientation of the container; a control system for determining a shortest rotational distance from the initial orientation to the desired rotational position between a clockwise direction and a counterclockwise direction; and a chuck engaged with the container and in communication with the control system for rotating the container the shortest rotational distance to the desired rotational position.

20 Claims, 15 Drawing Sheets

U.S. PATENT DOCUMENTS

| | | | | |
|---|---|---|---|---|
| 5,215,180 A | * | 6/1993 | Allard et al. | 198/395 |
| 5,224,586 A | * | 7/1993 | Naka et al. | 198/394 |
| 5,755,335 A | * | 5/1998 | Michelotti et al. | 198/394 |
| 6,398,006 B1 | * | 6/2002 | Dault | 198/377.01 |
| 6,484,478 B1 | * | 11/2002 | Arends et al. | 53/544 |
| 6,688,465 B2 | * | 2/2004 | Arends et al. | 206/427 |
| 2003/0047475 A1 | | 3/2003 | Arends et al. | |

* cited by examiner

SYSTEM AND METHOD FOR PACKAGING ORIENTED CONTAINERS

CROSS REFERENCE TO RELATED APPLICATIONS

This application is a continuation-in-part of U.S. patent application Ser. No. 10/280,205 filed Oct. 25, 2002 now U.S. Pat. No. 6,688,465, issued 10 Feb. 2004, which is a divisional application of U.S. patent application Ser. No. 09/490,212 filed Jan. 24, 2000 now U.S. Pat. No. 6,484,478, issued 26 Nov. 2002.

BACKGROUND OF THE INVENTION

1. Field of the Invention

This invention relates to a system and method for packaging a plurality of containers in a carrier in an oriented manner.

2. Description of Related Art

Container carriers are often thermoplastic ring-type carriers, commonly called "six-pack" rings, that unitize a plurality of containers into a single package. Cardboard, paperboard and plastic shrink wrap are also commonly used to unitize a plurality of containers. The unitized containers are generally randomly oriented so that each container is positioned in a different rotational orientation within the carrier. This random orientation results in problems related to displaying the package, particularly the container's trademark and graphics. In addition, it is often preferable to ensure that UPC labels on the respective containers are oriented correctly, either facing inward or outward.

According to one method known in the art, individual containers are rotated, either manually or mechanically, into a preferred orientation after packaging randomly oriented containers in the container carrier. Rotation of the containers once the containers are engaged within the container carrier may destroy the integrity of the container carrier through excessive torque applied to the respective thermoplastic rings within the container carrier. Alternatively, rotation of the containers may be impossible once the containers are sealed within other packages known to those having ordinary skill in the art.

Therefore, a need exists for a system and method of orienting containers within a package without destroying the integrity of the carrier or slowing the packaging process.

SUMMARY OF THE INVENTION

This invention relates to a system and method for packaging oriented containers in a container carrier, such as in a thermoplastic ring carrier, a paperboard box-style carrier or a plastic shrink wrapped carrier. The system preferably cooperates with an inlet conveyor and a packaging machine. A plurality of containers are preferably fed into an inlet of an orientation wheel. The orientation wheel is positioned to rotate each container into a proper orientation and at the same time move each container from the inlet of system toward the packaging machine.

Preferably the orientation wheel comprises one or more recesses each including a chuck for engaging one end of each container and a pressure plate for contacting an opposite end of such container. Flush, and preferably mating, contact is formed between the chuck and the container so that the container is rotatable in synchronization with the chuck. A motor is preferably mechanically coupled to the chuck to effect rotation of the container.

At least one sensor is additionally connected with respect to the orientation wheel for locating the oriented position of the container and sending a signal to the motor to stop the rotation of the container. The sensor preferably operates in connection with an index mark positioned on each container or on or in a label for each container. In one preferred combination, the sensor comprises an ultra-violet photocell and the index mark comprises a visually undetectable mark, such as an ultra-violet index mark, positioned on the container.

When the sensor identifies a correct rotational position of the container, the motor preferably stops rotation of the container and fixes the orientation of the container within the orientation wheel.

The oriented containers are then engaged with a transfer belt connected with respect to the orientation wheel. The transfer belt transfers an oriented container in a fixed rotational position from the orientation wheel to the packaging machine. The transfer belt may include a plurality of fingers spaced to receive oriented containers from the orientation wheel. The plurality of fingers are preferably tactile so as to grip oriented containers and prevent any rotation out of an oriented position. In addition, the transfer belt must grip with sufficient force to prevent rotation as the container slides along a stationary floor or against a stationary wall.

The transfer belt then feeds oriented containers directly into the packaging machine. In one application for the system according to this invention, the packaging machine includes a plurality of jaws positioned to apply the container carrier over two or more oriented containers resulting in a package of properly oriented containers. Alternatively, the packaging machine may include other arrangements, such as paperboard loaders, known to those having ordinary skill in the art. The orientation of each respective container may be adjusted relative to adjacent containers to match the configuration of the container carrier.

According to an additional preferred apparatus and method of the subject invention, a plurality of containers are fed into an orienter wheel having one or more chucks that engage each container. The system then senses an initial position of the container and, based upon a calculation, rotates the container with the chuck in a shortest rotational distance from the initial position of the container to an oriented position of the container. The oriented position of the container is then fixed and the container carrier is applied over two or more oriented containers.

The calculation described above preferably takes place within a control system and involves comparing the initial position of the container with a desired rotational position of the container and then calculating the shortest rotational distance between rotating the container in a clockwise direction or in a counterclockwise direction based upon the difference between the initial position and the desired rotational position of the container. As a result of this preferred embodiment, each container is rotated less than 180° thereby saving time and permitting orientation of containers at a faster rate than previously possible.

It is one object of this invention to provide a system and method for packaging a plurality of containers in a carrier in an oriented manner.

It is another object of this invention to provide a system and method for orienting a plurality of containers prior to packaging the containers in a carrier.

It is still another object of this invention to provide a system and method for packaging a plurality of containers wherein individual containers are rotated into orientation with or without an index mark on each respective container.

It is yet another object of this invention to provide a system and method for packaging a plurality of containers wherein individual oriented containers are transferred from an orientation station to a packaging machine in a fixed rotational position.

It is yet another object of this invention to provide a system and method for packaging a plurality of oriented containers wherein the oriented containers are individually and independently placed at a pickup location at a front end of a packaging machine.

It is yet another object of this invention to provide a system and method permitting orientation of adjacent containers in different rotational position relative to each other.

It is still another object of this invention to provide a package having a plurality of discreet containers with each container having at least three viewing panels wherein a carrier is positioned at one plane and the containers are oriented so that a different viewing panel for each container is visible on one side of the package.

It is yet another object of this invention to provide a system for orienting containers wherein each container is rotated less than 180°.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
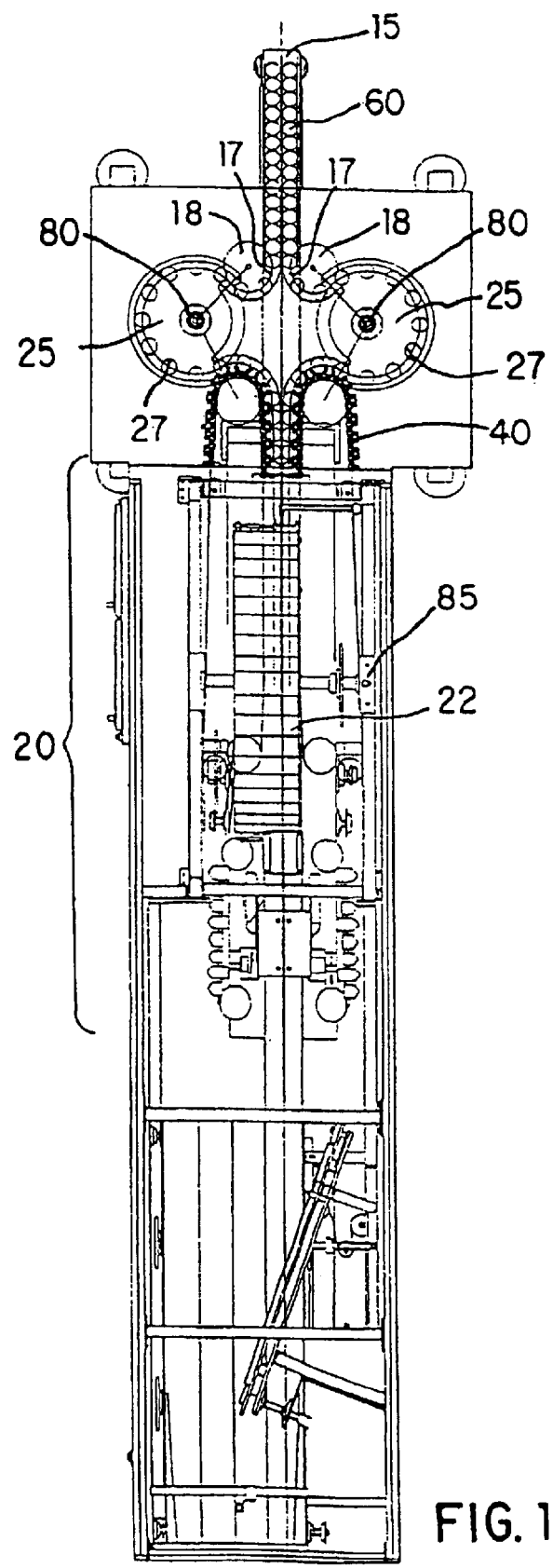
FIG. 1 is a top view of a system for packaging containers according to one preferred embodiment of this invention.

FIGS. 1–5 show a system for use with a packaging machine for orienting containers in a container carrier. The system is preferably used in connection with traditional packaging machines for applying container carrier 55 to a plurality of containers 60. Container carriers 55 may be, though not necessarily, formed from an elastic thermoplastic material having a plurality of container receiving openings, each for engaging a container 60. Alternatively, other packaging known to those having ordinary skill in the art, such as paperboard and shrinkwrap maybe used in connection with the system.

In one example of such traditional packaging machines, inlet conveyor 15 feeds the plurality of containers 60 into packaging machine 20 having a plurality of jaws 22. The plurality of jaws 22 preferably spread the container carrier 55 and engage each container 60 with the container receiving opening. When the jaws 22 are removed, the container carrier tightly engages a plurality of containers, and absent a system for orienting containers, each container is rotationally positioned in a generally random orientation. In alternative examples of such traditional packaging machines, inlet conveyor 15 feeds the plurality of containers 60 into paperboard carriers that are glued or otherwise sealed or into plastic sleeves that are shrunk wrapped or otherwise sealed.

The system according to one preferred embodiment of this invention preferably cooperates with inlet conveyor 15 and packaging machine 20. Inlet 17 of the system preferably accepts a plurality of containers 60 from inlet conveyor 15. Inlet 17 may comprise inlet wheel 18 for transfer and possible singularization of containers 60 from inlet conveyor 15 to orientation wheel 25. According to one preferred embodiment of this invention, inlet conveyor 15 provides two single file rows of containers 60 to inlet 17 of the system.

The system according to one preferred embodiment of this invention is preferably connected between a conventional inlet conveyor 15 and packaging machine 20. According to one preferred embodiment of this invention, the system comprises a small footprint to enable retrofitting of existing equipment.

The plurality of containers 60 from inlet conveyor 15 are preferably fed into inlet 17 of orientation wheel 25. Inlet 17 may comprise inlet wheel 18 to space and singularize containers 60 prior to receipt by orientation wheel 25. Orientation wheel 25 is positioned to rotate each container 60 into a proper orientation and at the same time move each container 60 from inlet 17 of system toward packaging machine 20. Preferably, orientation wheel 25 is generally round with a plurality of radially spaced recesses 27 formed within a perimeter, each recess 27 configured to accept one container 60 of the plurality of containers 60. Therefore, orientation wheel 25 preferably initiates or maintains singularization of the plurality of containers 60 into separate recesses 27. Orientation wheel 25 is not necessarily generally round and is susceptible to any other embodiment that permits singularization of containers 60.

Figure 5:
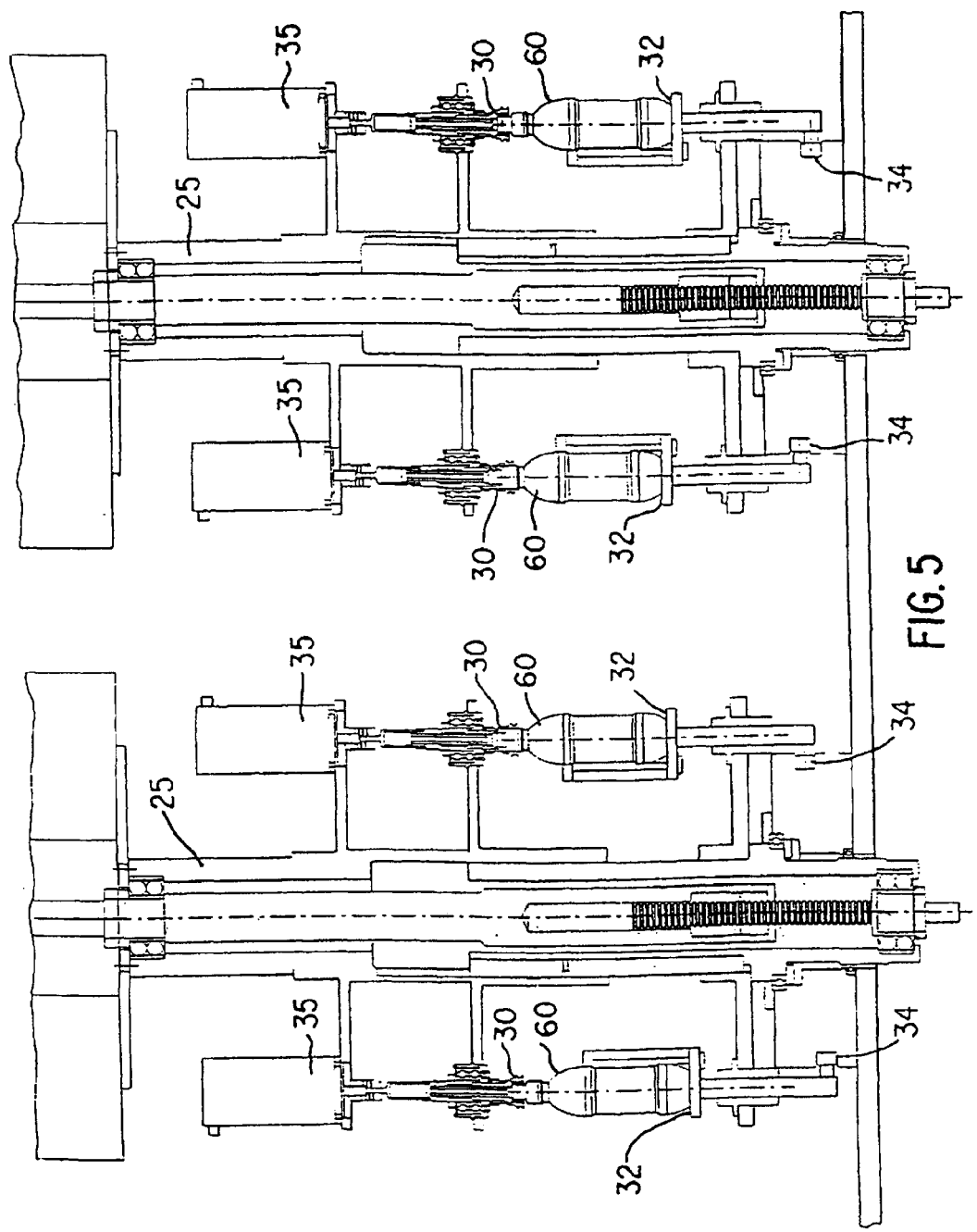
FIG. 5 is a cross-sectional side view of the system for orienting containers shown in FIG. 4.
Figure 6:
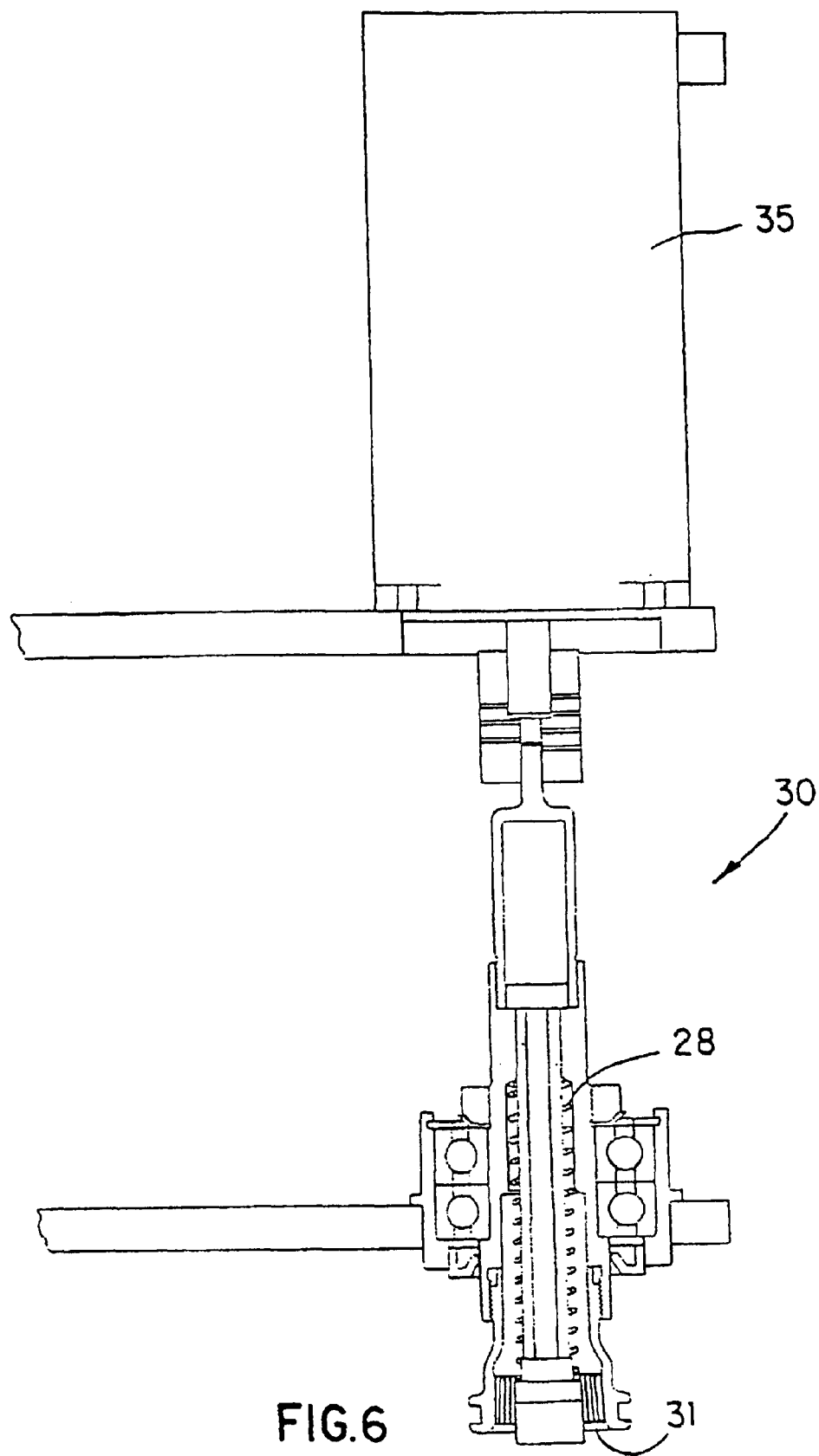
FIG. 6 is a cross-sectional side view of a chuck according to one preferred embodiment of this invention.

According to one preferred embodiment of this invention, one or more recesses 27 of orientation wheel 25 further includes chuck 30 for engaging one end of container 60. As best shown in FIGS. 5 and 6, chuck 30 preferably comprises sleeve 31 having an internal cavity formed to engage an end of container 60 in flush and/or mating contact. Flush, and preferably mating, contact is formed between chuck 30 and container 60 so that container 60 rotates in synchronization with chuck 30. In one preferred embodiment of this invention, the internal cavity of chuck 30 receives a bottle cap in mating engagement between ridges on the bottle cap and corresponding grooves in the internal cavity.

According to one preferred embodiment of this invention, each recess 27 further includes pressure plate 32 securing an opposite end of container 60 from chuck 30. Therefore, pressure plate 32 may engage a bottom of bottle, as shown in FIG. 5.

According to one preferred embodiment of this invention, cam 34 is operatively connected with respect to pressure plate 32 and moves pressure plate 32 toward chuck 30. Preferably, as orientation wheel 25 rotates, pressure plate 32 is lifted into engagement toward chuck 30. Pressure plate 32 may be slideably connected with respect to chuck 30. Chuck 30 may further include spring 28 to bias container 60 into position between sleeve 31 and pressure plate 32.

Figure 7:
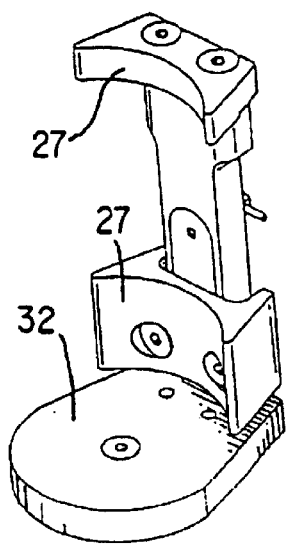
FIG. 7 is a perspective side view of a pressure plate according to one preferred embodiment of this invention.

As a result, container 60, such as a bottle, is firmly engaged between chuck 30 and pressure plate 32. As shown in FIG. 7, pressure plate 32, preferably, though not necessarily, comprises a generally flat, smooth surface that permits rotation of a bottom of container 60.

Motor 35 is preferably mechanically coupled to chuck 30 to rotate container 60. According to one preferred embodiment of this invention, when chuck 30 engages container 60, motor 35 rotates chuck 30 and thus rotates container 60.

Figure 4:
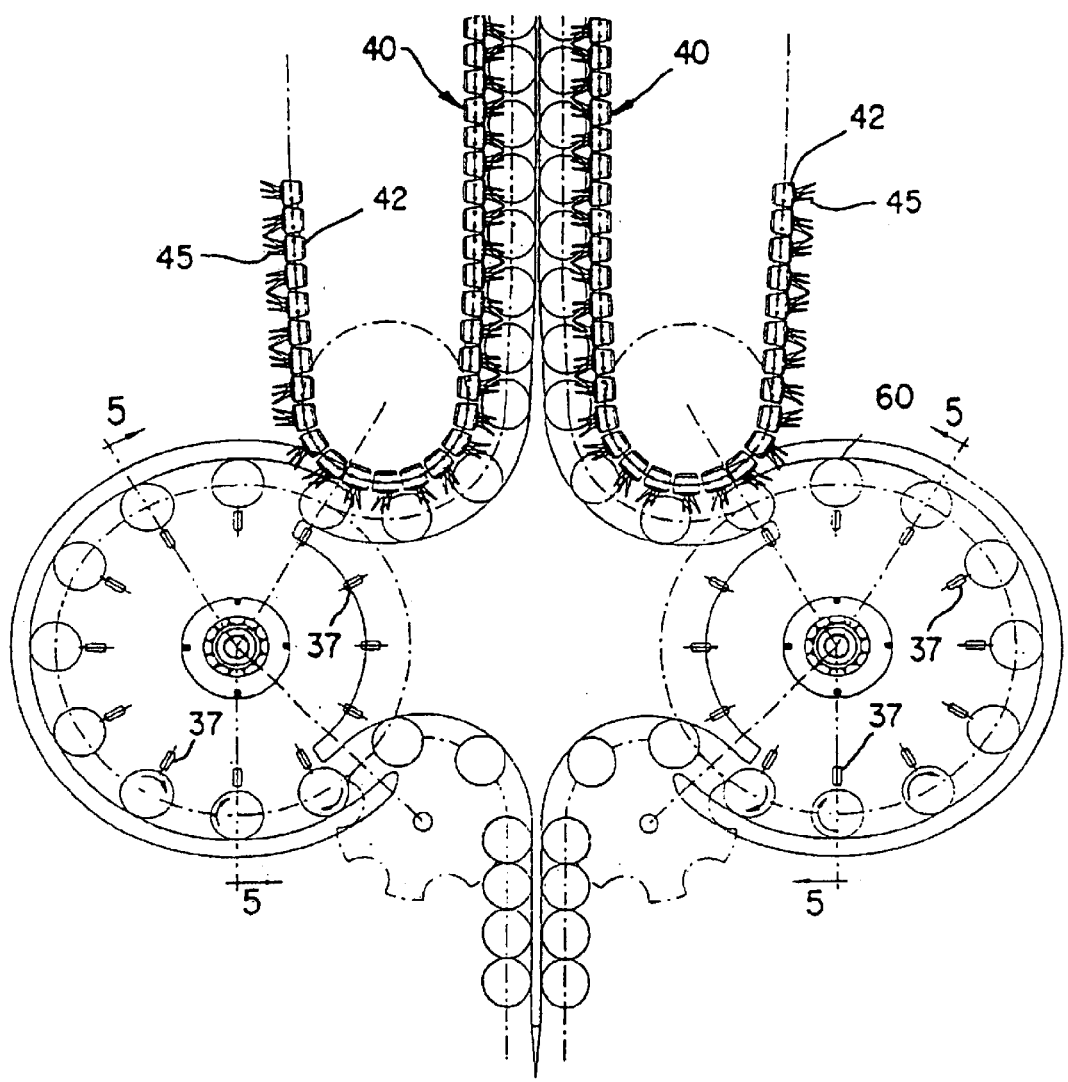
FIG. 4 is a diagrammatic top view of a system for orienting containers according to one preferred embodiment of this invention.

As shown in FIG. 4, at least one sensor 37 is additionally connected with respect to orientation wheel 25 for locating the oriented position of container 60 and stopping the rotation of container 60. Sensor 37 in one preferred embodiment of this invention sends an electronic signal to motor 35 thereby stopping the rotation of container 60 in an oriented position.

Figure 9:
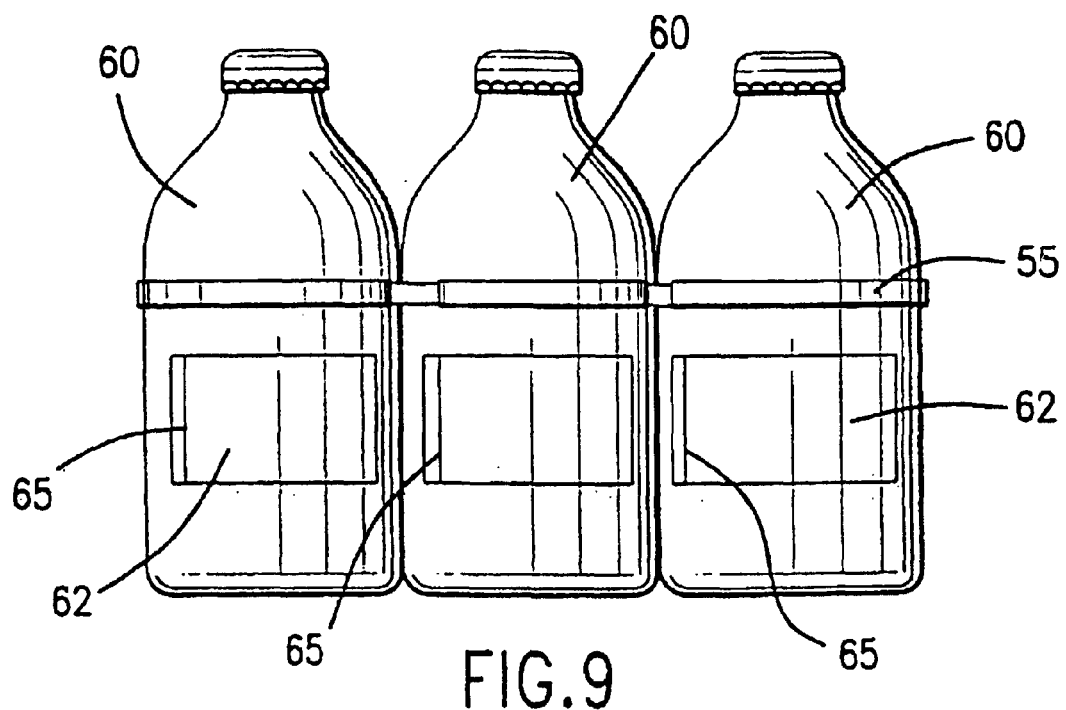
FIG. 9 is a side view of a package of oriented containers according to one preferred embodiment of this invention.
Figure 10:
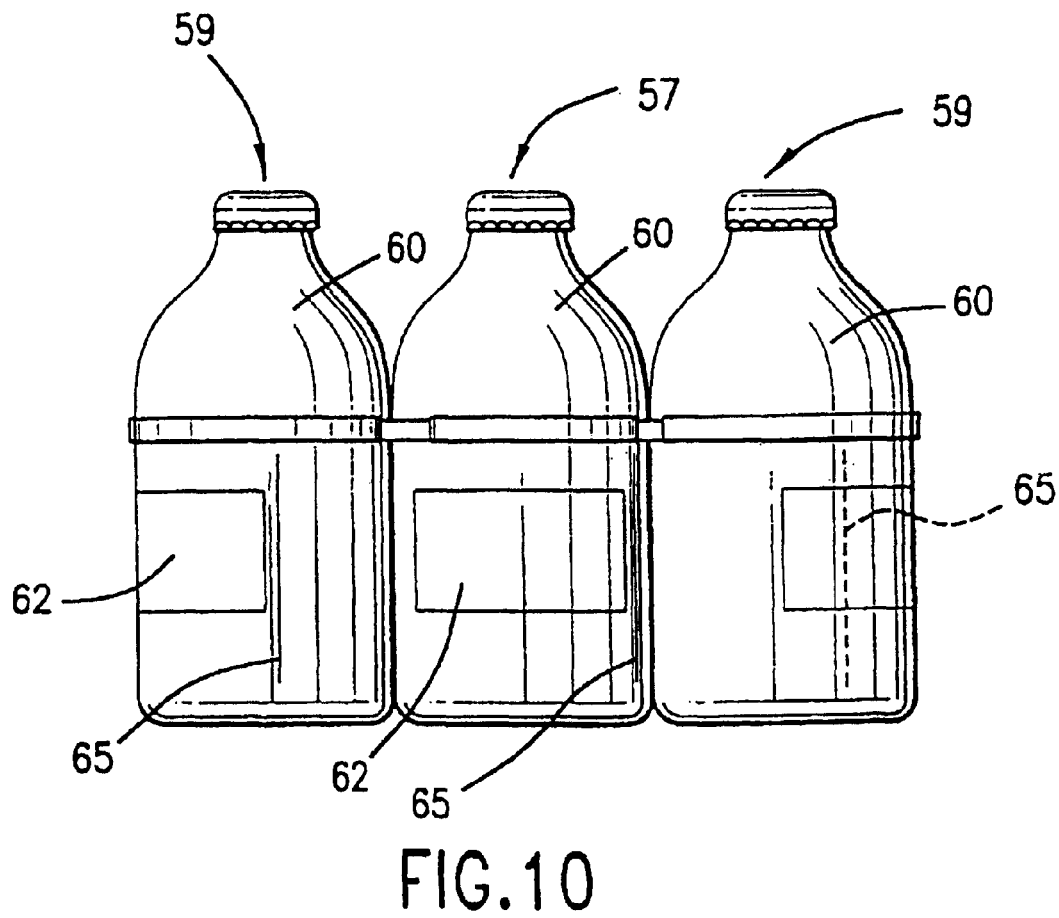
FIG. 10 is a side view of a package of oriented containers according to another preferred embodiment of this invention.

To optimize performance of sensor 37, each container preferably, though not necessarily, further comprises index mark 65 positioned on container 60, as shown in FIG. 10, or on or in container label 62, as shown in FIG. 9. According to one preferred embodiment of this invention, such index mark 65 comprises a visually undetectable mark, such as an ultra-violet index mark, positioned on the container 60. Alternatively, sensor 37 can read an existing graphic or physical characteristic of container 60, such as a design/graphic in container label 62 or a location of a seam in a sidewall of container 60 or a seam in container label 62.

Containers 60 are preferably substantially cylindrical and with vertical axes. Each container 60 may be separated into three 120° display panels positioned circumferentially around a sidewall of container 60. As such, depending upon the orientation of container 60, each container 60 can show a different display panel. Therefore, in a carrier having three containers 60 in a row, each of three different display panels may be positioned outwardly to comprise a single panoramic display. Depending upon the carrier configuration, container 60 may alternatively include two 180° display panels or any other appropriate group of display panels positioned circumferentially around a sidewall of container 60.

According to one preferred embodiment of this invention, sensor 37 comprises an ultra-violet photocell. The ultra-violet photocell preferably reads a corresponding ultra-violet index mark positioned on each container 60. An ultraviolet index mark is preferably undetectable on each container 60 so as to not disturb the visual impact of container 60 and/or container label 62.

When sensor 37 identifies a correct rotational position of container 60, motor 35 preferably rotates container 60 a preferred and/or preprogrammed offset or alternatively stops rotation of container 60. As a result, motor 35 fixes the orientation of container 60 within the respective position in orientation wheel 25. Accordingly, orientation wheel 25 individually and independently places an oriented container 60 at a pickup location at a front end of packaging machine 20.

As shown in FIGS. 1–4, transfer belt 40 is preferably connected with respect to orientation wheel 25. Transfer belt 40 transfers an oriented container 60 in a fixed rotational position from orientation wheel 25 to packaging machine 20. Transfer belt 40 preferably grips oriented container 60 with sufficient force to prevent rotation as oriented container 60 slides along a stationary floor or against a stationary wall of the system.

As shown in the figures, a system according to this invention preferably comprises two orientation wheels 25 and two transfer belts 40 which together result in the orientation and transfer of two rows of containers 60. This arrangement speeds up the packaging process and also cooperates with typical packaging machines 20 that accept two rows of containers 60.

Figure 2:
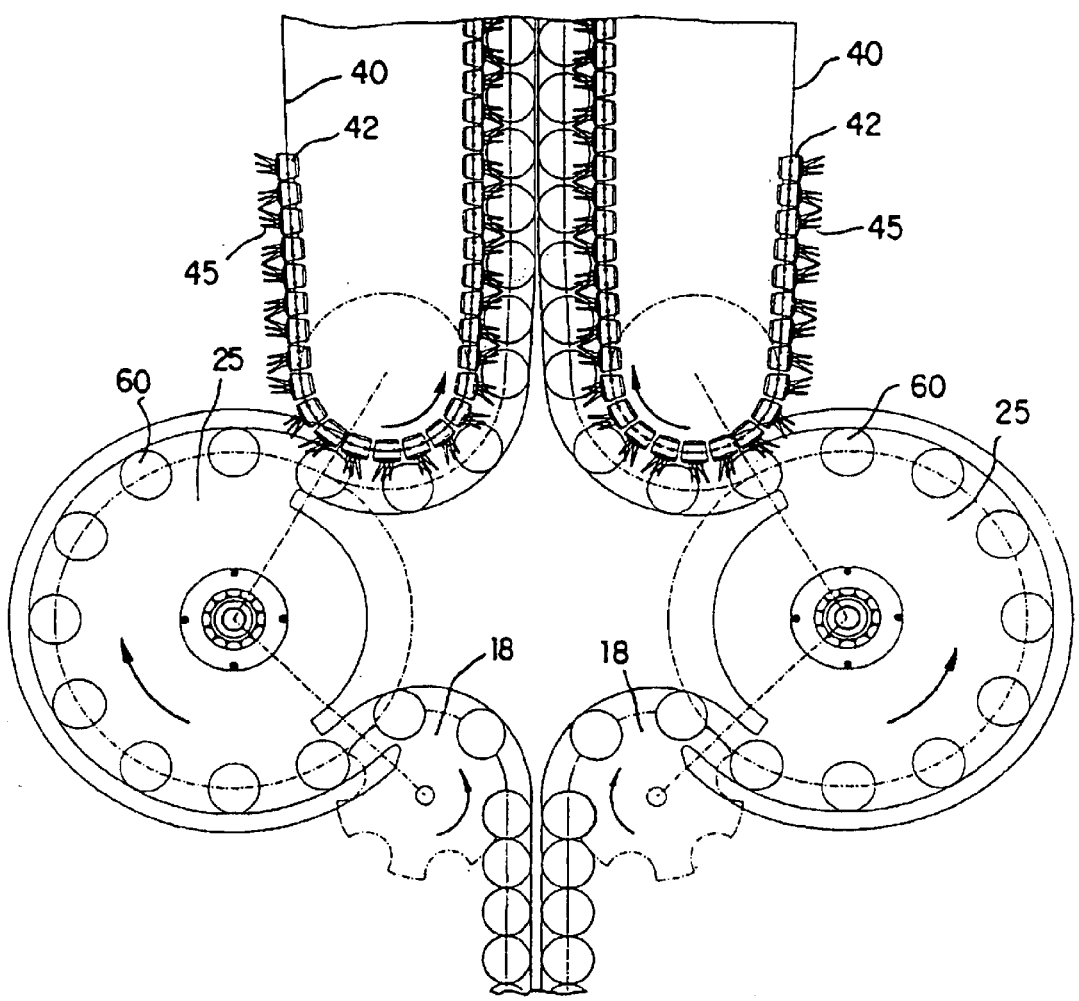
FIG. 2 is a top view of a system for orienting containers according to another preferred embodiment of this invention.
Figure 3:
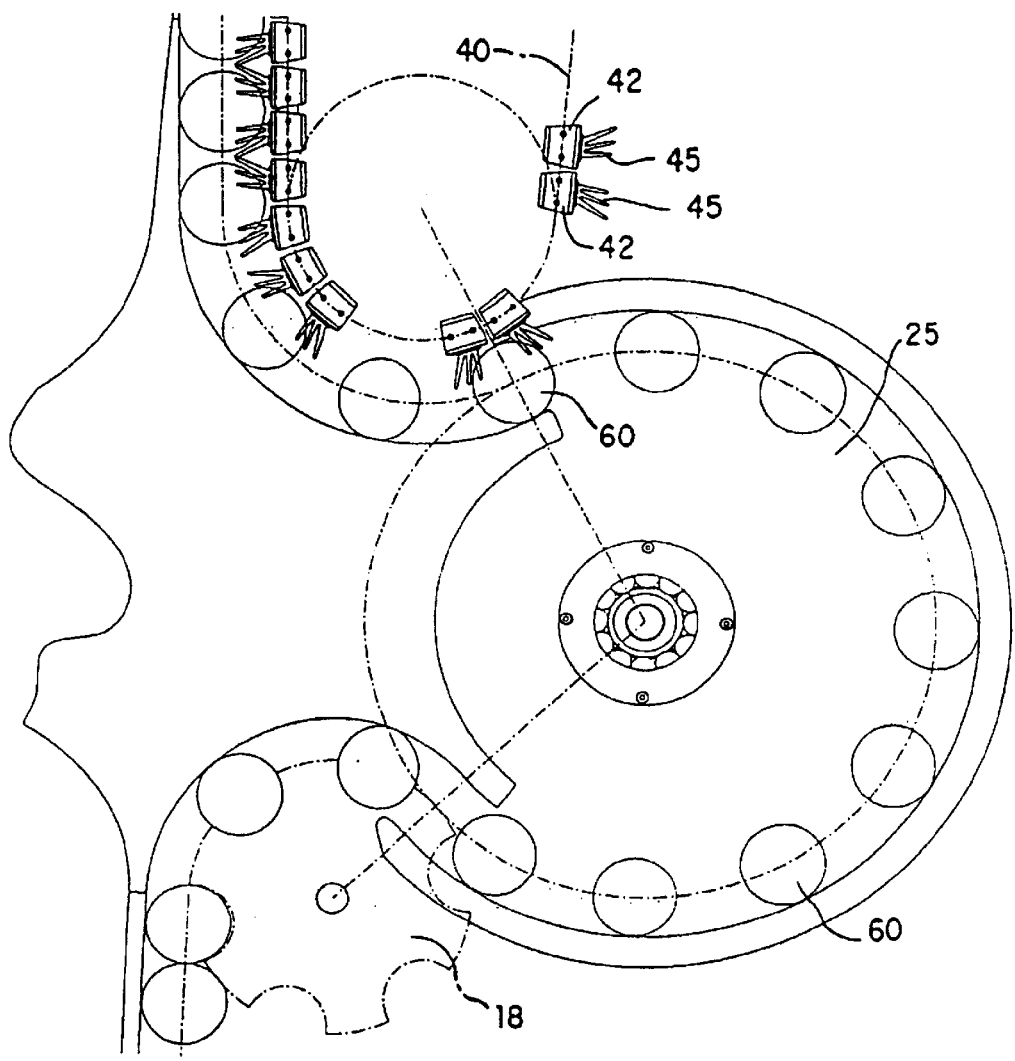
FIG. 3 is a diagrammatic top view of an orientation wheel and a transfer belt according to one preferred embodiment of this invention.
Figure 8:
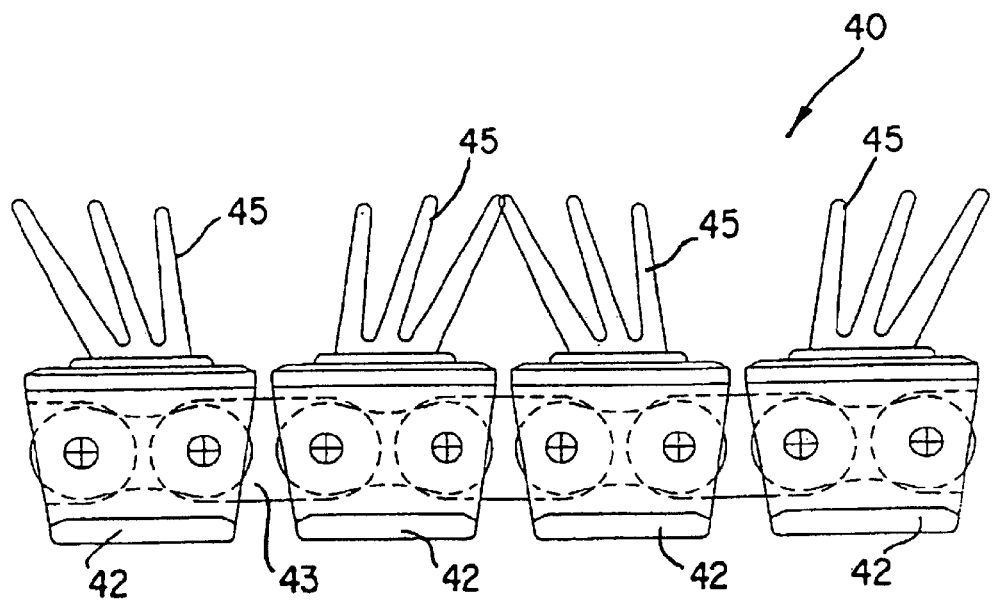
FIG. 8 is a top view of several links of a transfer belt according to one preferred embodiment of this invention.

As shown in FIGS. 2, 3 and 8, according to one preferred embodiment of this invention, transfer belt 40 comprises a plurality of fingers 45 spaced to receive oriented containers 60 from orientation wheel 25. The plurality of fingers 45 are preferably tactile so as to grip oriented containers 60 and prevent any rotation out of an oriented position. As shown in FIG. 8, transfer belt 40 may comprise a plurality of links 42 connected with respect to chain 43, similar to a drive chain, each link 42 containing one or more fingers 45.

According to one preferred embodiment of this invention, the plurality of fingers 45 are aligned in two groups of two or more fingers 45, each two groups for engaging one oriented container 60. Such an arrangement results in oriented container 60 nestled snugly between the two groups of fingers 45 and resists rotation of each oriented container 60 and contact with each adjacent oriented container 60. Transfer belt 40 as shown in FIGS. 2 and 3 comprises a preferred alignment of fingers 45 positioned so that each pair of adjacent links 42 contains two groups of divergent fingers 45 for accepting a single container 60.

According to one preferred embodiment of this invention, when transfer belt 40, and specifically chain 43, rotates around a sprocket, the adjacent two groups of fingers 45 are more separated than when transfer belt 40 is in a linear path. Therefore, when container 60 is loaded into transfer belt 40, the adjacent two groups of fingers 45 are spread to receive the container 60 and when transfer belt 40 maintains a linear course, the adjacent two groups of fingers 45 compact to tightly grip container 60 even as container 60 slides along stationary floor and sides of the system according to this invention and/or packaging machine 20.

Transfer belt 40 preferably feeds oriented container 60 from orientation wheel 25 directly into packaging machine 20. Alternatively, a similar, associated belt operatively connected to transfer belt 40 maintains the orientation of containers 60 as such containers are fed into packaging machine 20. Packaging machine 20 may include the plurality of jaws 22 positioned to apply container carrier 55 over two or more oriented containers 60.

According to one preferred embodiment of this invention, the system for orienting containers further includes an electronic timing system used to electronically synchronize cycles of orientation wheel 25 with packaging machine 20. Such electronic synchronization eliminates the requirement to mechanically couple and synchronize orientation wheel 25 with packaging machine 20. The electronic timing system preferably comprises proximity switch 80 and encoding switch 85 in communication between orientation wheel 25 and packaging machine 20. Encoding switch 85 is preferably positioned on a rotating shaft, such as the rotating shaft shown in FIG. 1, of packaging machine 20 and communicates with proximity switch 80 on orientation wheel 25 for synchronizing cycles between orientation wheel 25 and packaging machine 20.

A resulting package is shown in FIG. 9 wherein each container 60 is oriented in the same manner creating a package of containers 60 having a uniform appearance. FIG. 10 shows an additional embodiment of the resulting package wherein containers 60 are oriented depending on the relative position of container 60 within the package.

According to one preferred embodiment of this invention, sensor 37 or other device within system calculates which containers 60 are to be positioned in corners 59 of container carrier 55 and which containers 60 are to be positioned in center 57 of container carrier 55. Based upon the intended position of each respective container 60 within container carrier 55, orientation wheel 25 and associated sensor or sensors 37 orient containers 60 in corner 59 of container carrier 55 in a different orientation from containers 60 in center 57 of container carrier 55. This is preferable because containers 60 in corner 59 of container carrier 55 may have a visual exposure of 270° or more and containers 60 in center 57 of container carrier 55 have much less of a visual exposure. It may therefore result in a more aesthetically pleasing package if containers 60 in corners 59 of container carrier 55 are rotationally oriented so that the respective labels or graphics are centered at precise corners 59 of the package, as shown in FIG. 10.

Figure 11:
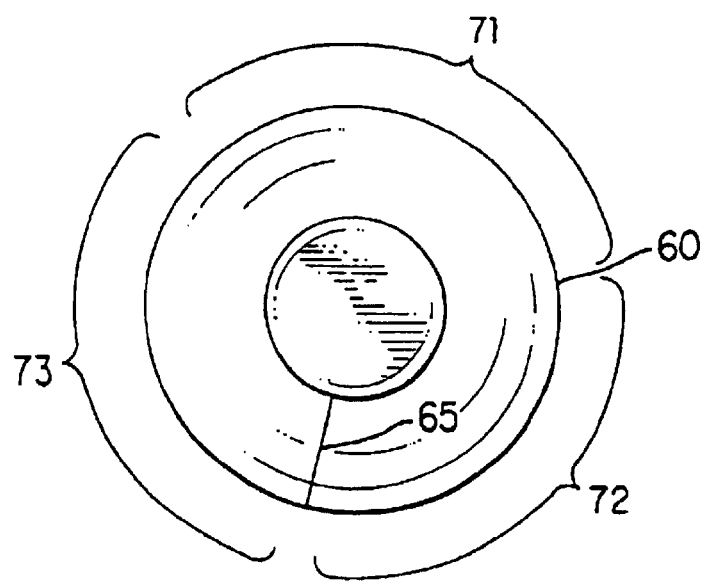
FIG. 11 is a top view of a container having three display panels according to one preferred embodiment of this invention.
Figure 12:
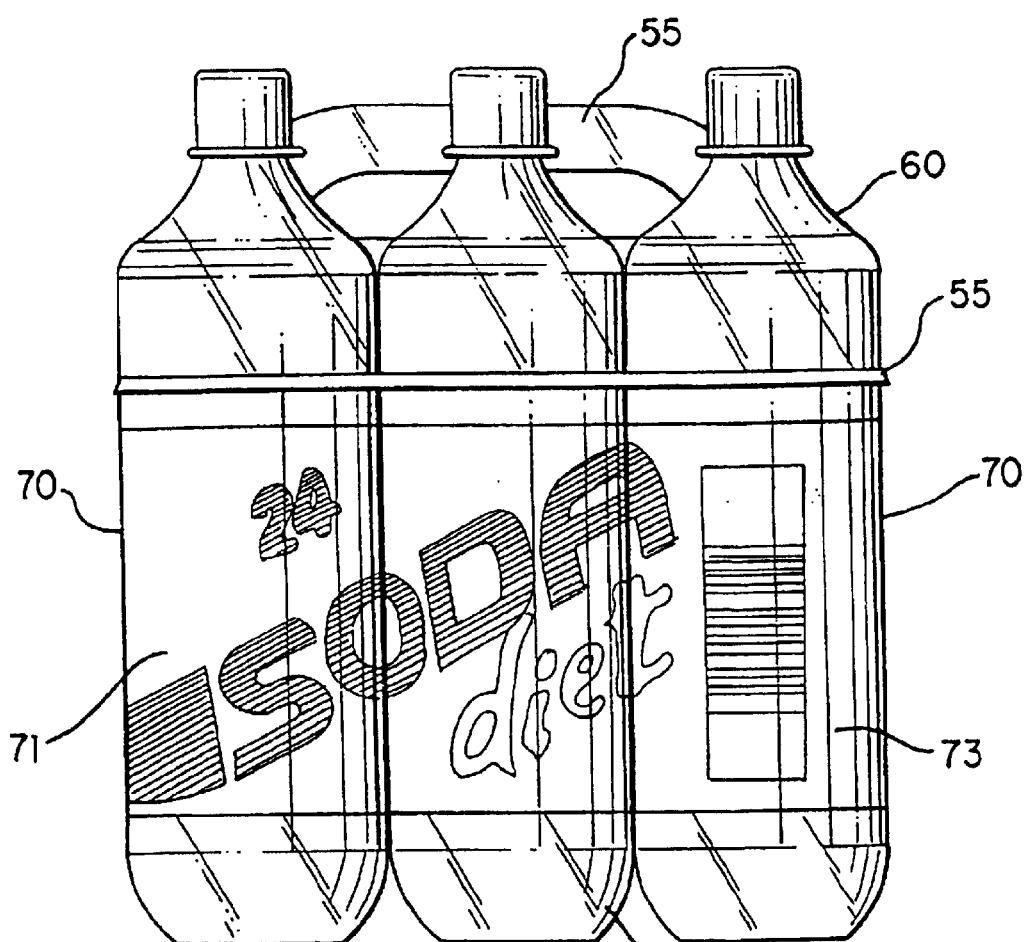
FIG. 12 is a side view of a package of oriented containers according to one preferred embodiment of this invention.

According to one preferred embodiment of this invention, a package having a plurality of containers 60 with each container 60 having two or more viewing panels 70, such as three viewing panels 71, 72, 73 shown in FIG. 11, wherein container carrier 55 is positioned along one plane and containers 60 are oriented so that a different viewing panel 71, 72, 73 for each container 60 is visible on one side of the package, as shown in FIG. 12.

A method of packaging a plurality of containers 60 in a container carrier 55 according to this preferred embodiment comprises feeding a plurality of containers 60 into orientation wheel 25. Each container 60 preferably includes two or more display panels 70 positioned circumferentially around a sidewall of each container 60. Orientation wheel 25 preferably fixes a first rotational position of a first container of the plurality of containers into a first oriented position displaying a first display panel 71. Orientation wheel 25 then preferably fixes a second rotational position of a second container of the plurality of containers adjacent the first container into a second oriented position displaying a second display panel 72. Depending upon the desired configuration, two or more containers 60 may be oriented in consecutive alignment. In a preferred embodiment of this invention for use in connection with a six-pack container carrier 55, a third oriented position 73 of a third container adjacent the second container may also be fixed by orientation wheel 25.

Figure 13:
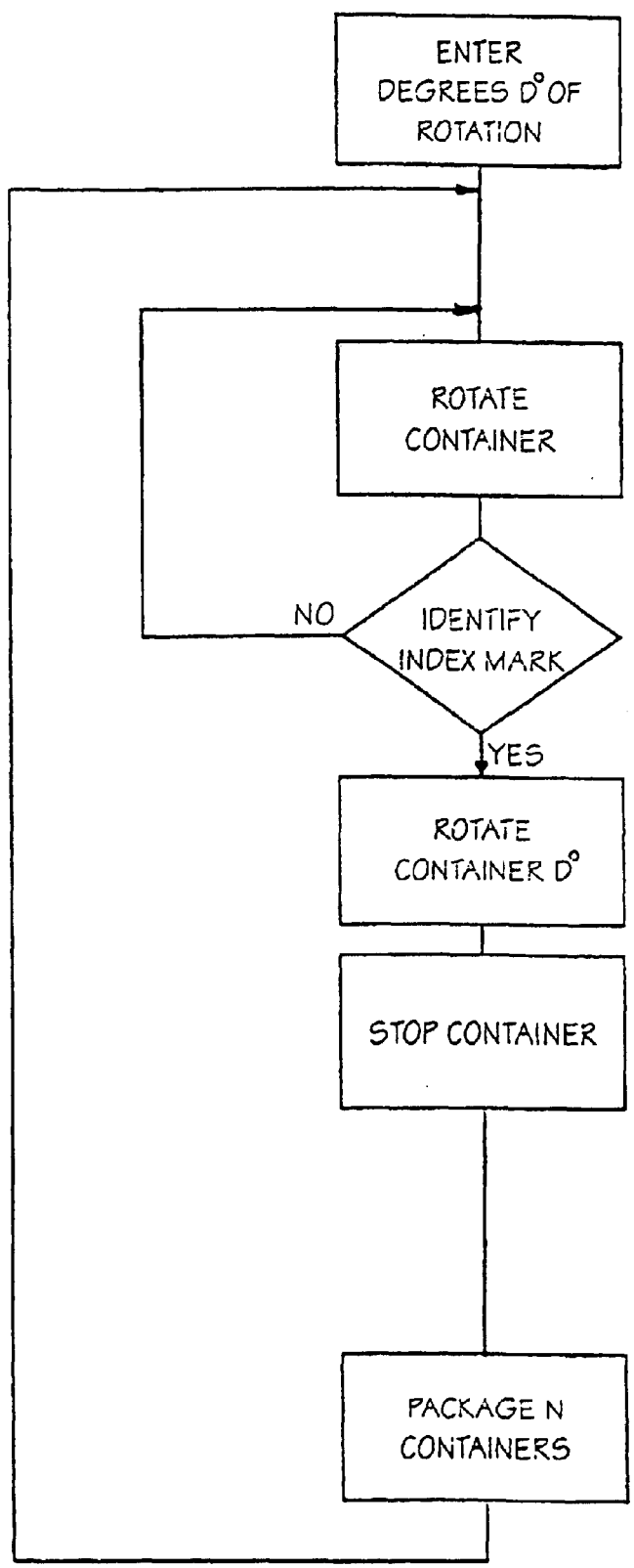
FIG. 13 is a flow chart describing a method for packaging oriented containers according to the package shown in FIG. 9.

According to one preferred embodiment of this invention, orientation wheel 25 comprises twelve chucks 30, each chuck having motor 35 and sensor 37. Each motor 35 and sensor 37 is preferably independently programmable to set a preferred offset angle of rotation once index mark 65 is read by sensor 37. Accordingly, each chuck 30 can be adjusted to a desired offset resulting in twelve independent chuck adjustments for adjusting offsets in packages containing four, six, eight, twelve and twenty-four oriented containers 60. According to one preferred embodiment of this invention, each chuck 30 is programmed with the same offset resulting in each container 60 in a row having the same orientation within container carrier 55. FIG. 13 shows a flow chart for orienting containers 60 having a predetermined rotational offset according to one preferred embodiment of this invention.

According to another preferred embodiment of this invention, each chuck 30 is adjusted to have a different offset so that containers 60 within container carrier 55 have at least two different orientations within a row of oriented containers 60. The configuration of this invention having twelve chucks 30 is thus capable of orienting containers 60 in sets of one, two, three, four, six and twelve.

According to one preferred embodiment of this invention, an output screen associated with the system displays a numerical representation of each of the twelve chucks 30 in order (i.e., 01–12), together with a numerical representation of the rotational offset and a counter indicating an error code. The error code preferably counts the number of containers that are improperly oriented in a given production period. In one preferred embodiment of this invention, chuck 30 rotates each container 60 a predetermined number of rotations, such as one and one-half turns, seeking index mark 65. If no index mark 65 is identified within the predetermined number of rotations, an error code is entered in association with the respective chuck 30. Therefore, if the error code indicates a high number of improperly oriented containers 60, an operator may check to confirm that sensor 37 is clean and/or properly functioning or chuck 30 is rotating properly.

Figure 14:
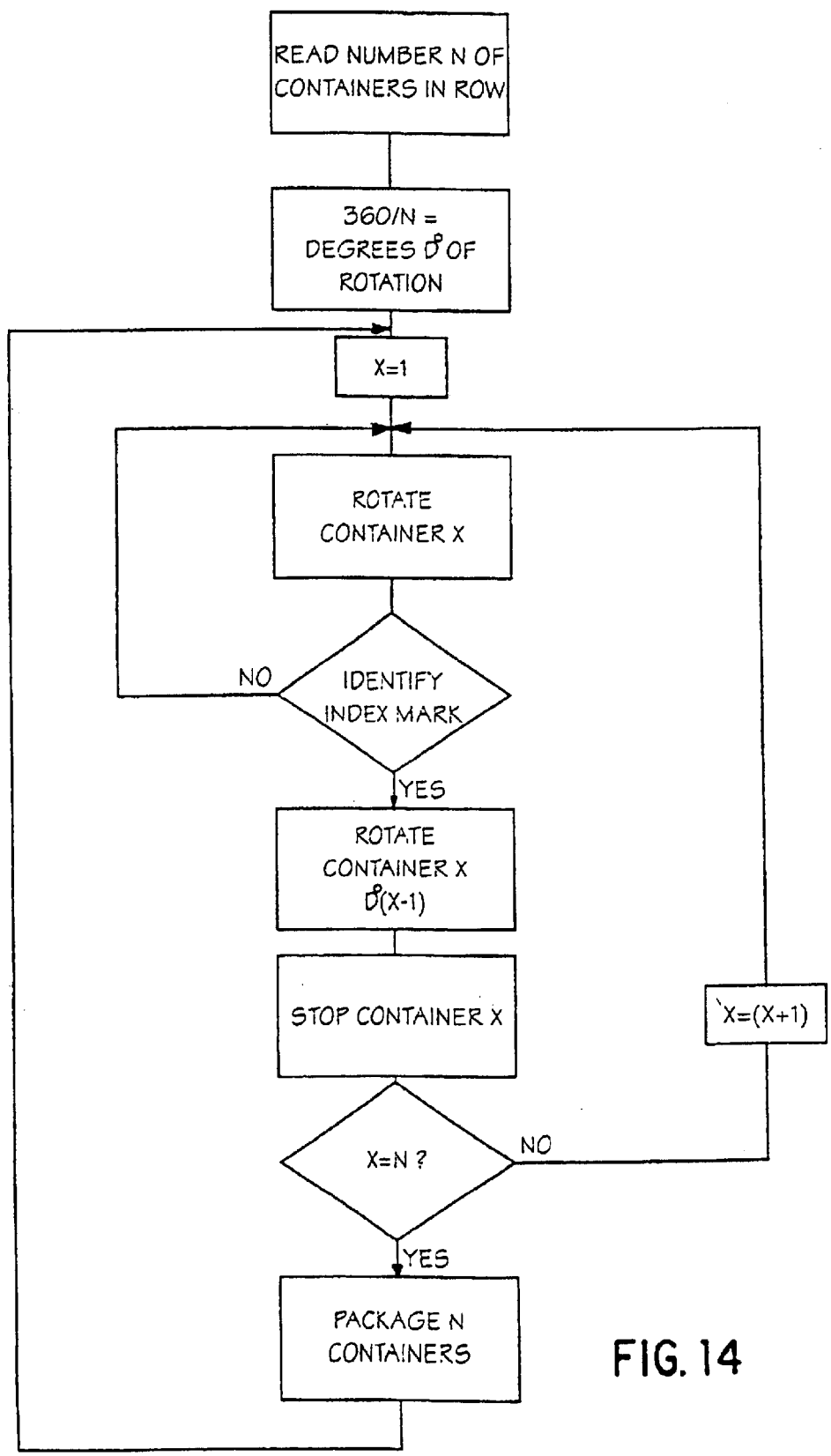
FIG. 14 is a flow chart describing a method for packaging oriented containers according to the package shown in FIG. 12.

Alternatively, chucks 30 may be programmed with continuous logic to accommodate rotation of a continuous flow of containers through orientation wheel 25. FIG. 14 shows a flow chart for orienting containers 60 having different viewing panels 71, 72, 73 according to one preferred embodiment of this invention.

Transfer belt 40 then preferably transfers the first container, the second container and the third container, each separately in a fixed rotational position, from orientation wheel 25 to packaging machine 20. Packaging machine 20 preferably applies container carrier 55 over the first container, the second container and the third container so that the first display panel, the second display panel and the third display panel together display a unitary display. FIG. 12 shows a package having three containers aligned with three display panels 71, 72, 73 facing outward from package. As described above, sensor 37 may detect index mark 65 positioned on container 60 to sense and fix the first, second and/or third rotational position of the container.

Finally, macros may be programmed to enable an operator to select a desired configuration or brand of containers 60 and the relative offsets are automatically programmed into each chuck 30. Therefore, if the operator selects "twenty-four pack" and "lemon-lime soda," the required offsets are entered into each chuck 30 so that the system is adjusted to orient containers of lemon-lime soda in a twenty-four pack configuration.

FIGS. 15–19 show additional preferred embodiments of the subject invention. As shown in FIGS. 15–19 and described hereafter, the various elements are designated with different, but similar, nomenclature as the preceding embodiments and it is understood that various features of the following embodiment may be combined and used with the features described in the previously described embodiments.

Figure 15:
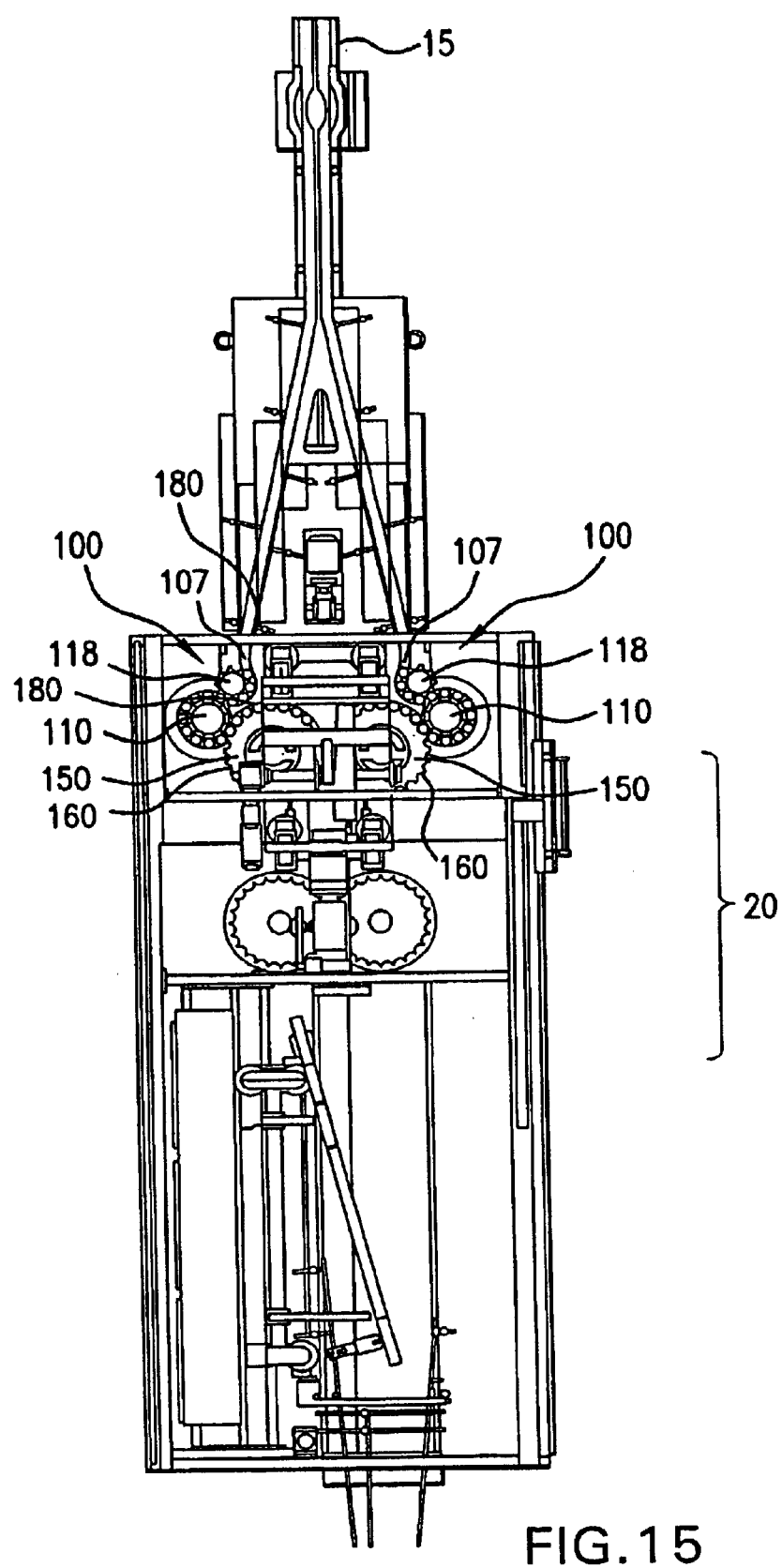
FIG. 15 is a top view of a system for packaging containers according to one preferred embodiment of this invention.

FIG. 15 shows an orienter device for orienting container 60 in a desired rotational position prior to placement in a container carrier. The system according to one preferred embodiment of this invention is preferably connected between a conventional inlet conveyor 15 and packaging machine 20. According to one preferred embodiment of this invention, the system comprises a small footprint to enable retrofitting of existing equipment.

The plurality of containers 60 from inlet conveyor 15 are preferably fed into inlet 107 of orienter device 100, such as shown across two divided lanes that diverge from inlet conveyor 15. Inlet 107 may comprise inlet wheel 118 to space and singularize containers 60 prior to receipt by orienter device 100. Containers 60 are typically in an arbitrary rotational position as they enter orienter device 100.

Orienter device 100 is preferably positioned to rotate each container 60 into a proper orientation and at the same time move each container 60 from inlet 107 of system toward packaging machine 20. Preferably, orienter device 100 is generally formed in a wheel with a plurality of radially spaced chucks 140 for engaging one end of container 60. However, orienter device 100 is not necessarily wheel shaped and is susceptible to any other embodiment that permits orientation of containers 60 as described below.

According to this preferred embodiment, orienter device 100 includes reader 120 for determining an initial orientation of container 60 and control system 130 for directing container 60 into an oriented position. Reader 120 may comprise digital camera 125 or similar device for capturing an image of container 60 or otherwise determining an initial orientation of container 60. Specifically, reader 120 may comprise a system manufactured by SENCON of Bedford Park, Ill. Control system 130 preferably determines a shortest rotational distance from the initial orientation to the desired rotational position between a clockwise direction and a counterclockwise direction and then provides a signal to move container 60 either counterclockwise or clockwise to reach the desired rotational position in the shortest rotational distance. As shown schematically in FIG. 19, control system 130 may be physically adjacent reader 120 or, alternatively, may be remotely positioned from reader 120 and orienter device 100.

As in the previously described embodiments, chuck 140 is engaged with an end of container 60. Chuck 140 is preferably in communication with control system 130 for rotating container 60 the shortest rotational distance to the desired rotational position. Chuck 140 is accordingly capable of movement in both a clockwise and a counter-clockwise direction so as to position container 60 in the desired rotational position in the shortest rotational distance and thus the shortest possible time period. Therefore, a bi-directional motor 145 is preferably connected to the chuck 140 and in communication with control system 130.

Figure 16:
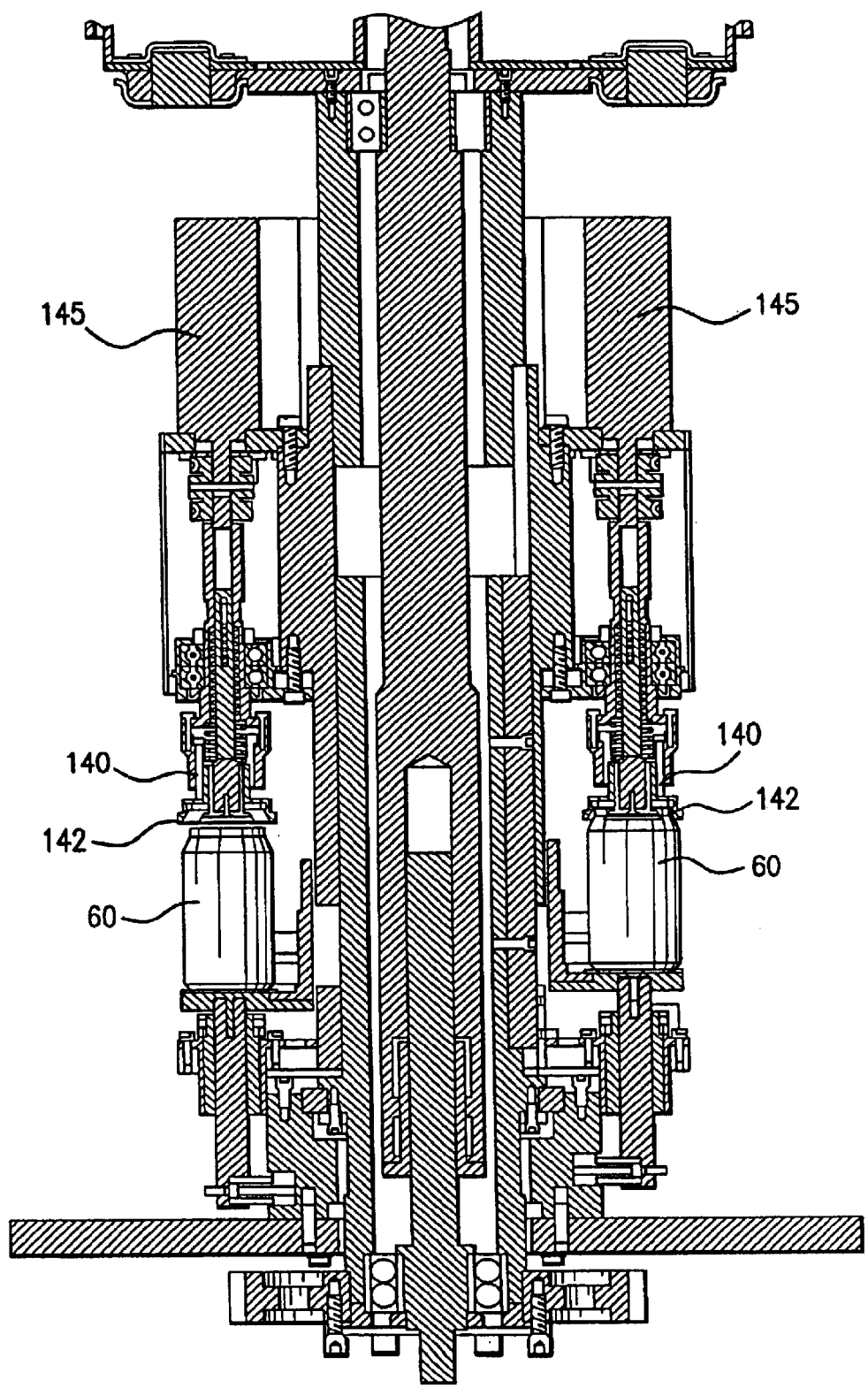
FIG. 16 is a cross-sectional front view of the system for orienting containers shown in FIG. 15.

Control system 130 of orienter device 100 thereby preferably calculates a distance between the initial orientation of container 60 and the desired rotational position of container 60 and provides a signal to chuck 140 to move container 60 to reach the desired rotational position in the shortest rotational distance. As best shown in FIG. 16, chuck 140 preferably includes cap 142 having an internal cavity formed to engage an end of container 60 in flush and/or mating contact. Flush, and preferably mating, contact is formed between chuck 140 and container 60 so that container 60 rotates in synchronization with chuck 140.

Unlike prior embodiments described herein, the subject embodiment identifies a known starting point when reader 120 identifies the initial rotational position of container 60. This is contrary to prior described embodiments wherein an initial rotational position is unknown and container 60 is rotated until a known index mark is reached. The presently described system improves the efficiency of the system because the initial position is determined or acquired thereby minimizing rotational movement into the desired position.

Figure 17:
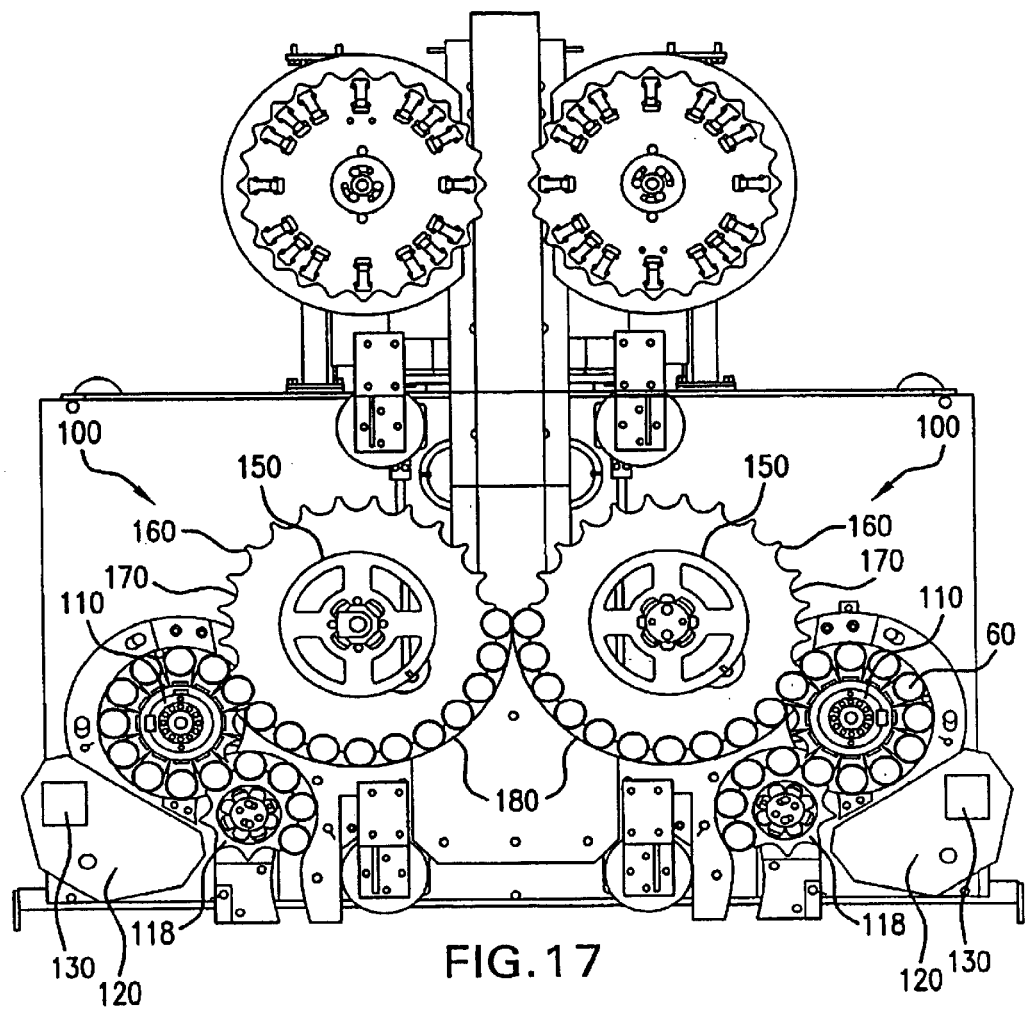
FIG. 17 is a magnified top view of the system for orienting containers shown in FIG. 15.
Figure 18:
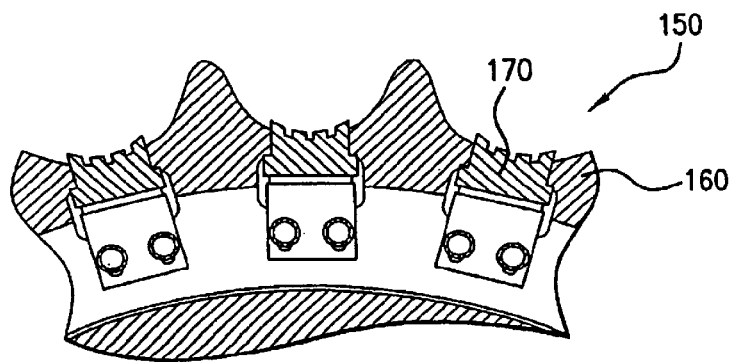
FIG. 18 is a top view of a portion of an orienter having a plurality of pockets according to one preferred embodiment of this invention.
Figure 19:
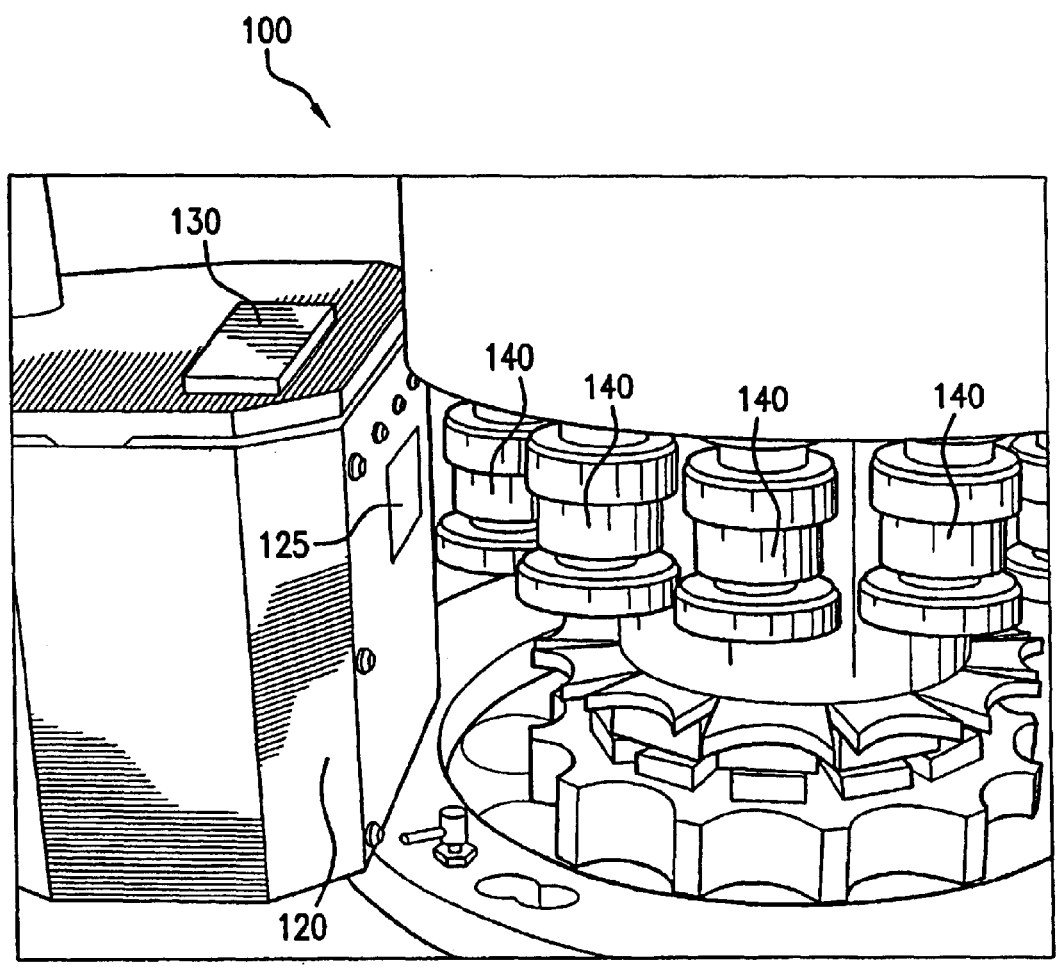
FIG. 19 side view of a portion of an orienter according to one preferred embodiment of this invention.

According to a preferred embodiment of this invention best shown in FIGS. 15 and 17, orienter device 100 includes a plurality of chucks 140 arranged in a wheel, such as orienter wheel 110 shown. Such an arrangement permits rotation of containers 60 into an oriented position while, at the same time, moving such containers toward packaging machine 20.

The present system may additionally comprise star wheel 150 having a plurality of pockets 160. Star wheel 150 preferably directs containers 60 positioned in a desired rotational, or oriented, position from orienter device 100 to packaging machine 20. Each pocket 160 of star wheel 150 accommodates container 60 and maintains the desired rotational position of container 60 from a respective chuck 140 to the container carrier in packaging machine 20. Unlike other embodiments described herein, the subject embodiment does not require a transfer belt or similar device as the oriented containers 60 are passed directly from orienter wheel 110 to star wheel 150. Such direct transfer minimizes potential for losing the orientation of each container 60.

Star wheel 150 may further include resilient insert 170 positioned in each pocket 160 and slide plate or rail 180 positioned around an outer perimeter of star wheel 150. Each oriented container 60 is preferably wedged between resilient insert 170 and slide plate or rail 180 thereby maintaining the rotational position of container 60 as container 60 is moved around star wheel 150 toward packaging machine 20. Slide plate or rail 180 preferably includes a smooth surface or coating such as TEFLON to permit the oriented containers 60 to slide freely without disrupting the rotational position.

Accordingly, a preferred method of packaging a plurality of containers in a container carrier according to this invention includes feeding containers into orienter wheel 110 having one or more chucks 140 that engage each container 60. The subject system then senses an initial position of container 60 and, based upon a calculation, rotates container 60 with chuck 140 in a shortest rotational distance from the initial position of container 60 to an oriented position of container 60. The oriented position of container 60 is then fixed and the container carrier is applied over two or more oriented containers 60.

The calculation described above preferably takes place within control system 130 and involves comparing the initial position of container 60 with a desired rotational position of container 60 and then calculating the shortest rotational distance between rotating container 60 in a clockwise direction or in a counterclockwise direction based upon the difference between the initial position and the desired rotational position of container 60. As a result of the described protocol, each container 60 is rotated less than 180° thereby saving time and permitting orientation of containers 60 at a faster rate than previously possible.

While in the foregoing specification this invention has been described in relation to certain preferred embodiments thereof, and many details have been set forth for purpose of illustration, it will be apparent to those skilled in the art that the system and method according to this invention are susceptible to additional embodiments and that certain of the details described herein can be varied considerably without departing from the basic principles of the invention.

We claim:

1. An orienter device for orienting a container in a desired rotational position prior to placement in a container carrier, the orienter device comprising:
   a reader for reading a rotational position of the container and determining an initial orientation of the container;
   a control system for obtaining the initial orientation of the container from the reader and determining a shortest rotational distance from the initial orientation to the desired rotational position between a clockwise direction and a counterclockwise direction; and
   a chuck engaged with the container and in communication with the control system, wherein the chuck rotates the container in shortest rotational distance to the desired rotational position in response to the control system.

2. The orienter device of claim 1 wherein the control system calculates a distance between the initial orientation of the container and the desired rotational position of the container and provides a signal to the chuck to move the container to reach the desired rotational position in the shortest rotational distance.

3. The orienter device of claim 1 further comprising a plurality of chucks arranged in a wheel.

4. The orienter device of claim 1 further comprising:
   a star wheel having a plurality of pockets, each pocket of the plurality of pockets accommodating a container, the star wheel maintaining the desired rotational position of the container from the chuck to the container carrier.

5. The orienter device of claim 1 further comprising:
   a resilient insert positioned in each pocket of the plurality of pockets.

6. The orienter device of claim 1 further comprising:
   a bi-directional motor connecting the chuck to the control system.

7. The orienter device of claim 1 wherein the reader comprises:
   a digital camera to capture an image of the container.

8. A system for packaging oriented containers in a container carrier, the system receiving a plurality of unoriented containers at an inlet, the system comprising:
   a digital reader, the digital reader determining an initial orientation of an unoriented container of the plurality of unoriented containers;
   an orienter wheel connected with respect to the inlet and in communication with the digital reader, the orienter wheel including a rotatable chuck, the rotatable chuck receiving a signal from the digital reader and rotating the unoriented container in a shortest rotational distance from the initial orientation into an oriented position having a desired rotational position; and
   a packaging machine for placing a container carrier around a plurality of oriented containers.

9. The system of claim 8 further comprising:
   a star wheel positioned directly adjacent to the orienter wheel, the star wheel having a plurality of pockets for transferring the oriented containers to the container carrier.

10. The system of claim 9 wherein each pocket of the plurality of pockets includes an insert for maintaining the oriented position of the oriented container.

11. The system of claim 9 further comprising: a rail positioned around a perimeter of the star wheel, the rail having a smooth surface to permit the oriented containers to slide along the rail.

12. The system of claim 8 further comprising:
    a control system, the control system receiving the initial orientation from the digital reader and calculating a distance between the initial orientation of the unoriented container and the desired rotational position of the oriented container and providing a signal to the rotatable chuck within the orienter wheel to move the container counterclockwise or clockwise to reach the desired rotational position in the shortest rotational distance.

13. A method of packaging a plurality of containers in a container carrier comprising:
    feeding a container of the plurality of containers into an orienter wheel having at least one chuck;
    engaging the container with the chuck;
    sensing an image of an initial position of the container;
    determining a shortest rotational distance from the initial rotational position of the container to an oriented position of the container;
    rotating the container with the chuck in the shortest rotational distance from the initial rotational position of the container to the oriented position of the container;
    fixing the container into the oriented position; and
    applying the container carrier over two or more oriented containers.

14. The method of claim 13 further comprising:
    comparing the initial position of the container with a desired rotational position of the container; and
    calculating the shortest rotational distance between rotating the container in a clockwise direction and a counterclockwise direction based upon the difference between the initial position and the desired rotational position of the container.

15. The method of claim 13 further comprising:
    transferring an oriented container in a fixed rotational position from the orienter wheel to a packaging machine.

16. The method of claim 13 further comprising:
    transferring an oriented container in a fixed rotational position from the orienter wheel to a star wheel; and
    transferring the oriented container in the fixed rotational position from the star wheel to a packaging machine.

17. The method of claim 13 further comprising:
    rotating the container less than 180°.

18. The method of claim 13 further comprising:
    moving at least a portion of the container into flush contact with the chuck.

19. A method of orienting a container comprising:
    feeding a container into an orienter device;
    fixing the container into a rotatable chuck;
    sensing an initial position of the container from an image of the container;
    determining a shortest rotational distance from the initial position of the container to an oriented position of the container; and
    rotating the rotatable chuck and the container clockwise or counterclockwise into the oriented position of the container in the shortest rotational distance.

20. The method of claim 19 further comprising: rotating the container less than 180°.

* * * * *